US006875958B2

(12) United States Patent
Soavi et al.

(10) Patent No.: US 6,875,958 B2
(45) Date of Patent: Apr. 5, 2005

(54) METHOD AND AN APPARATUS FOR MONITORING THE COOKING OR ROASTING PROCESS OF FOOD

(75) Inventors: Alessandro Soavi, Modena (IT); Corrado Cristiani, Modena (IT)

(73) Assignee: Angelo Po Grandi Cucine S.p.A., Carpi (IT)

( * ) Notice: Subject to any disclaimer, the term of this patent is extended or adjusted under 35 U.S.C. 154(b) by 0 days.

(21) Appl. No.: 10/407,018

(22) Filed: Apr. 4, 2003

(65) Prior Publication Data

US 2004/0091018 A1 May 13, 2004

(30) Foreign Application Priority Data

Apr. 4, 2002 (DE) ........................................ 102 14 923

(51) Int. Cl.[7] ........................... A47J 37/00; F27D 11/04

(52) U.S. Cl. ....................................... 219/413; 219/497

(58) Field of Search ................................ 219/413, 490, 219/497, 509; 426/523

(56) References Cited

U.S. PATENT DOCUMENTS 4,554,440 A * 11/1985 Lee, Jr. ...................... 219/501
5,844,209 A 12/1998 Gunther
5,928,546 A * 7/1999 Kramer et al. .............. 219/497

FOREIGN PATENT DOCUMENTS

DD 2759928 A * 2/1990

OTHER PUBLICATIONS

Patent Abstracts of Japan vol. 1999, No. 6, Mar. 31, 1999 & JP01–158915, Jun. 22, 1989.

* cited by examiner

*Primary Examiner*—Joseph Pelham
(74) *Attorney, Agent, or Firm*—Dilworth & Barrese, LLP.

(57) ABSTRACT

The invention relates to a method and an apparatus for monitoring the cooking or roasting process of foods in which, in accordance with the invention, an electrical, electromagnetic or magnetic property of the food or one of its parts is measured during the cooking or roasting process. The invention further relates to an apparatus for the carrying out of the method in accordance with the invention.

27 Claims, 5 Drawing Sheets

METHOD AND AN APPARATUS FOR MONITORING THE COOKING OR ROASTING PROCESS OF FOOD

BACKGROUND OF THE INVENTION

The invention relates to a method of monitoring the cooking or roasting process of foods and an apparatus for carrying out this method.

In the heat treatment of foods for the preparation thereof, i.e. in cooking or roasting, the quality of the gastronomic result depends on a series of factors. These include the temperature and the moisture as well as the oven compartment ventilation during cooking and/or roasting. On the other hand, the chemical and physical properties and the dimensions of the food to be prepared also play a large role for the gastronomic result to be achieved. However, the positioning of the food in the interior of the oven area also plays a role. The cooking and/or roasting process thus depends only in part on the heat distribution and the reliable heat transfer inside the oven area. Prior preservation or preparation treatments of the food naturally also play a substantial role for the gastronomic result in addition to the factors already addressed. Provided that the different above-mentioned factors are taken into account during the cooking and/or roasting process of the food, a desired gastronomic result can be achieved. A gastronomic result is here understood, on the one hand, as the taste attainable through the cooking and/or roasting process or also the appearance of the food after the cooking and/or roasting process, for example the producing of a certain crust on the surface of a roast.

The monitoring of the cooking and/or roasting results is currently carried out at best by the monitoring of the temperature development inside the food. In this connection, different methods are known of measuring the temperature inside the food during the cooking and/or roasting process.

SUMMARY OF THE INVENTION

It is the object of the present invention to provide a method of monitoring the cooking and/or roasting process of foods on the basis of which it is made possible to achieve a desired preparation result of the food. It is furthermore the object of the invention to provide an apparatus to carry out the method.

This object is solved in accordance with the invention by a method of monitoring the cooking and/or roasting process of foods. Accordingly, an electrical, electromagnetic or magnetic property of the food or of one of its parts is measured during the cooking or roasting process. The invention is based on the recognition that the electrical, electromagnetic or magnetic properties of the food to be prepared change during the heat treatment, with this change correlating with the preparation result of the food. For instance, additional substantial information on the preparation status of the food can, for example, be gained by the measurement of the electrical impedance change within the food during the heat treatment process. For example, the liquid loss and/or weight loss of the food can be determined during the cooking and/or roasting process. The degree of hydration and the chemical and physical change within the organic tissue of the food can thus be determined continuously.

Special aspects of the method in accordance with the invention are included herein. For instance the change in the electrical electromagnetic or magnetic properties of the food can be advantageously measured in dependence on the time.

The electrical impedance, the electrical resistance the insulation resistance of the food or the magnetic permeability of the food are possible parameters which can be measured accordingly.

In this connection, an electrical voltage field of any amplitude, frequency or waveform can be applied to the food during the measurement. Not only the above-mentioned electrical, electromagnetic or magnetic properties can be measured here, but also the current resulting from the application of the electrical voltage field.

On the other hand, an electrical current of any amplitude, frequency or waveform can be applied to the food during the measurement. Here, too, the above-mentioned properties can be measured and in particular the voltage can be measured which results from the application of the current to the food.

Alternatively, a magnetic field of any amplitude, frequency or waveform can be applied to the food during the above-mentioned measurement. The measurement of the electrical, electromagnetic or magnetic property can serve the determination of characteristic properties originating from the pre-treatment of the food.

On the other hand, it can alternatively, or also additionally, be used to determine the change in the organic tissue of the food at its surface or in its inside during the cooking or roasting process.

However, on the basis of the monitoring results, a control, modification, correction or optimisation of the change in the organic tissue of the food at its surface or in its inside can also take place during the cooking and roasting process. For example, the temperature control of the oven, optionally the pressure in the oven area, the moisture or the fan speed can be correspondingly changed here depending on the current measurement result.

In accordance with a further aspect of the present invention, an apparatus for carrying out the above-said method is claimed in which at least one sensor is included having electrodes which can be applied to the surface of the food or led into the inside of the food. In addition, in accordance with a preferred aspect of this apparatus, at least one temperature sensor can be additionally provided.

BRIEF DESCRIPTION OF THE DRAWINGS

Further details and advantages of the invention will be explained with reference to the embodiments and diagrams shown in the Figures. There are shown.

DESCRIPTION OF THE PREFERRED EMBODIMENTS

Figure 1:
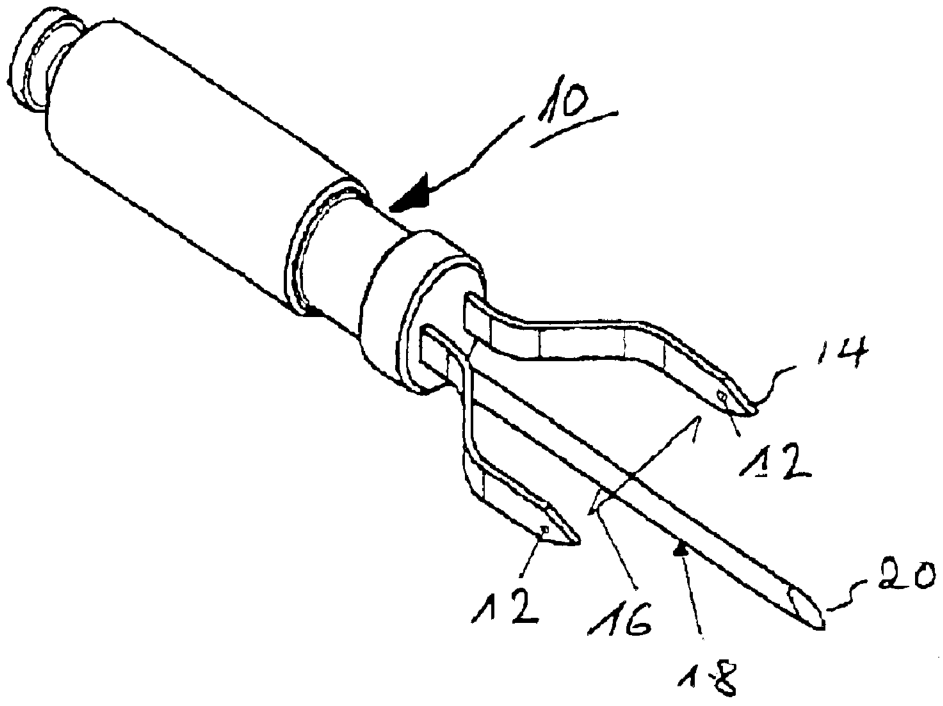
FIG. 1: a perspective view of a probe as is used in an apparatus in accordance with the invention.

In FIG. 1, a probe 10 is shown at which two electrodes 12 are arranged in the manner of a fork. The electrodes taper into tips 14 which allow an insertion into the food. The impedance field 16 lying between the electrodes is measured by means of the electrodes 12. The evaluation device can be assumed to be known and is therefore not shown in more detail here. In accordance with the embodiment of FIG. 1, a temperature sensor 18 is shown in the probe 10 in addition to the electrodes 12 for the measurement of the impedance, said temperature sensor 18 being made comparatively longer than the electrodes 12. The probe is thus suitable for a measurement of the impedance field 16 at the surface of a food, while at the same time the temperature development on the inside of the food is recorded by means of the temperature measuring sensor 18. The temperature measuring sensor 18 also has a tip 20 tapering to a tip to allow an insertion into the food to be monitored.

Figure 2:
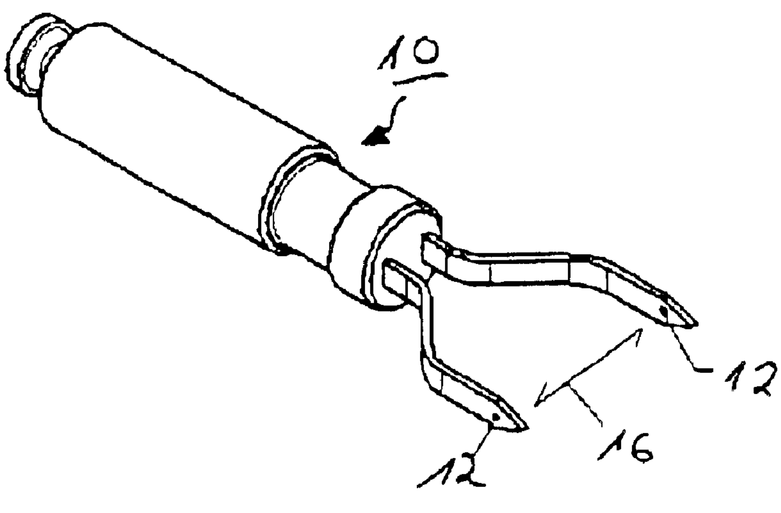
FIG. 2: an alternative aspect of a probe as is used in the present invention.

In FIG. 2, a probe 10 of a similar design is shown which, however, only has the two electrodes 12 for the reception of the impedance field 16.

Figure 3:
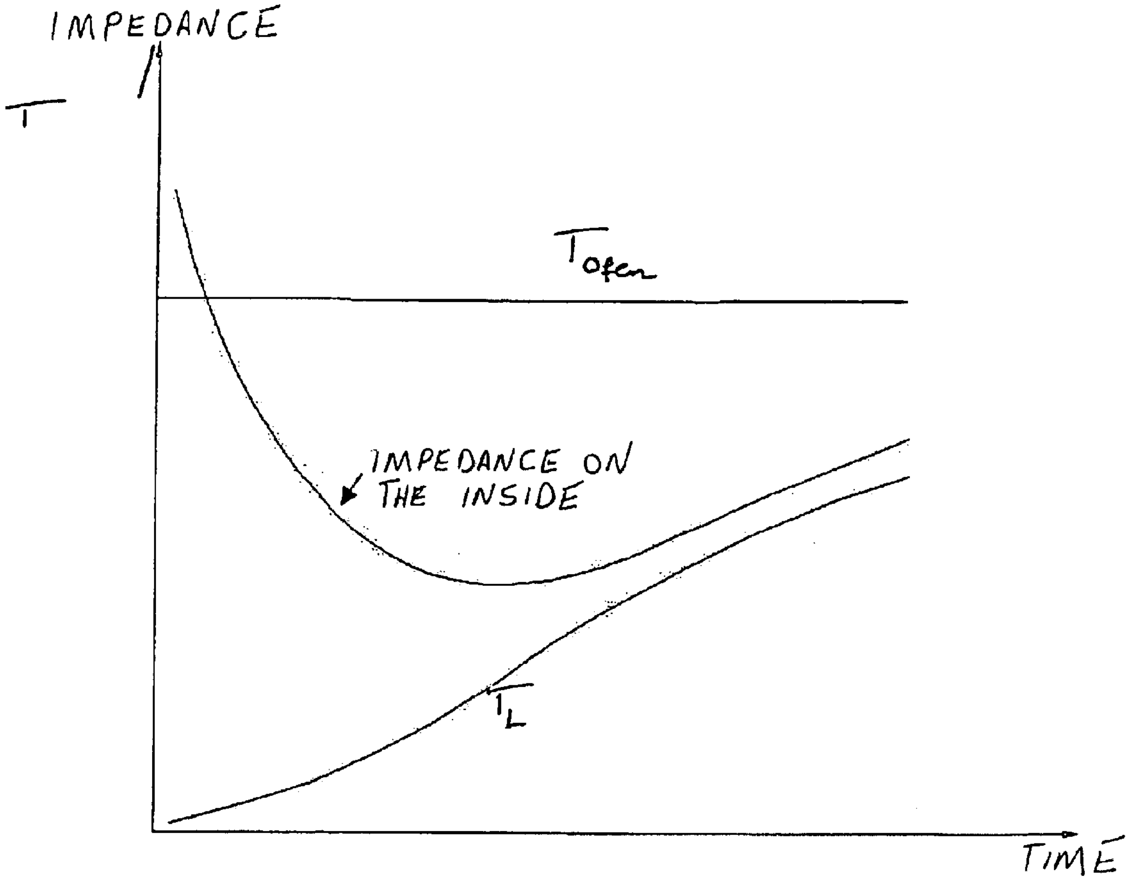
FIG. 3: the curve of the impedance and of the temperature on the inside of a food recorded over time.

The development over time of the impedance and of the temperature in the food can be explained with reference to the diagram shown in FIG. 3. The temperature development on the inside of the food $T_L$ increases continuously over time at a constant temperature within the oven $T_{Ofen}$, as shown in FIG. 3. As the temperature increases, the impedance of the food changes, as is shown with reference to the curve of impedance which was here recorded on the inside of the food. This change in impedance is a measure for the degree of dehydration in the food. The impedance measurement can here be carried out, for example, with one of the probes previously described.

Figure 4:
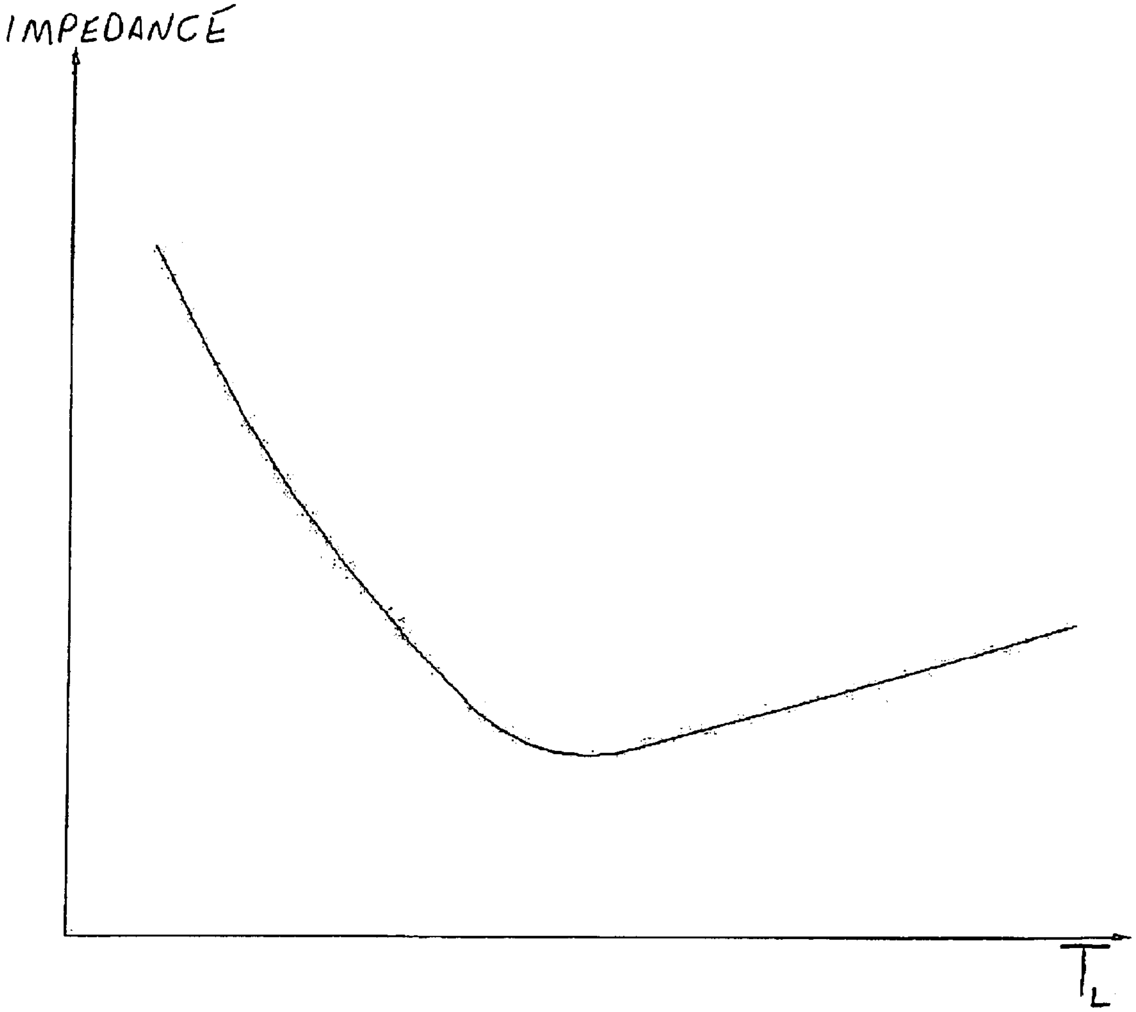
FIG. 4: a diagram with reference to the impedance curve in dependence on the temperature inside the food.

In FIG. 4, the dependence of the impedance on the inside of the food on the temperature on the inside of the food is shown. When taking into account comparative or calibration curves obtained by way of experiment, it is possible to change the cooking conditions, for example the temperature or the moisture inside the oven chamber in order to accelerate or slow down the cooking or roasting procedure, with here the impedance being as close as possible to the minimum—with reference to the diagram in accordance with FIG. 4A—in order to minimise the weight reduction or food dehydration not wanted for the gastronomic results.

Figure 5:
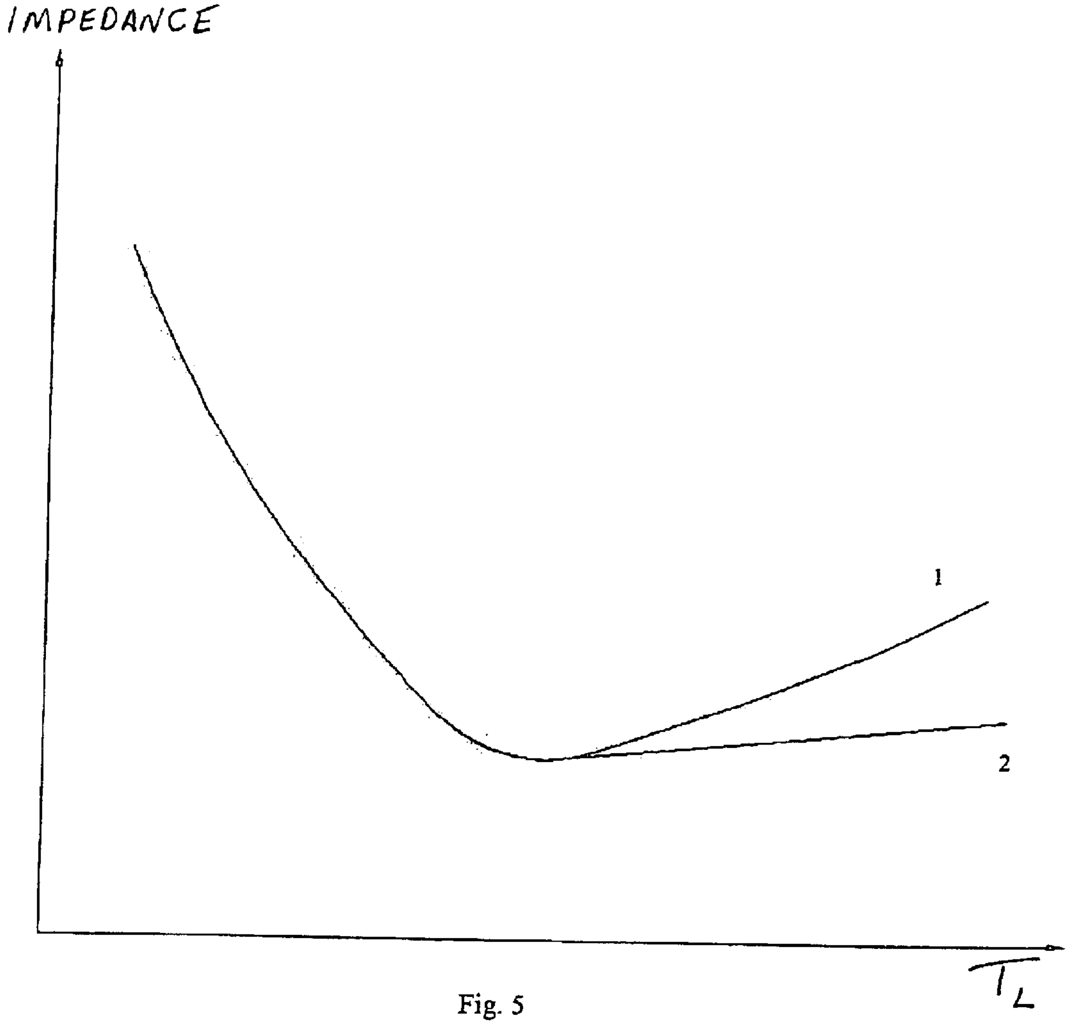
FIG. 5: the curve of impedance inside the food in dependence on the temperature measured on the inside of the food under two different cooking conditions.

In FIG. 5, the curves of impedance over the temperature on the inside of the food are shown for different oven conditions. Here, the temperature and the moisture inside the oven space have been changed and it becomes clear that at comparatively high temperatures, the impedance temperature curve has a different course than at other temperature and moisture conditions. This brings about a different gastronomic result at a comparative final temperature on the inside of the food.

Figure 6:
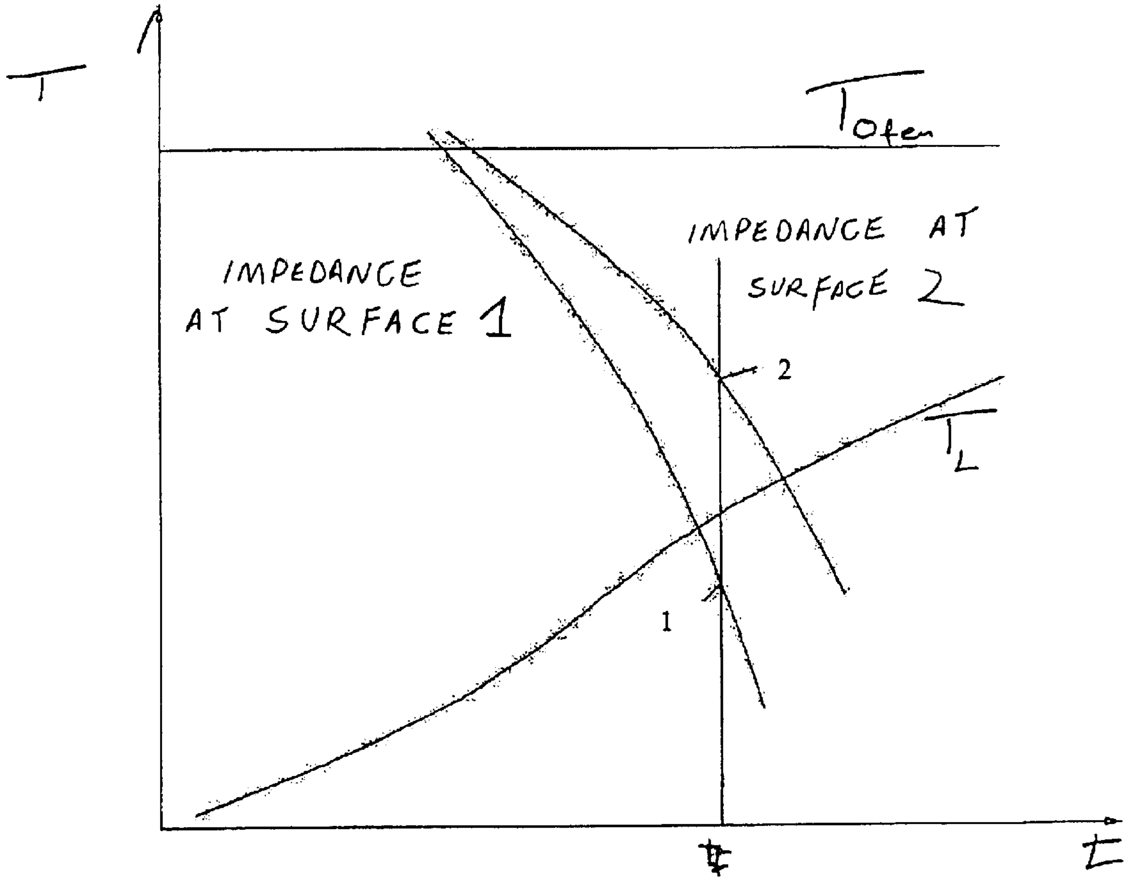
FIG. 6: a diagram with the curves of impedance and temperature recorded at the food surface by means of probes in dependence on time.

It is possible on the basis of this knowledge made useful for the invention to regulate the cooking point or roasting point at the food surface, as should be explained with reference to FIG. 6. Here, on the one hand, the constant oven temperature $T_{Ofen}$ is shown and the temperature development $T_L$ on the inside of the food. The curves 1 and 2 respectively record two impedance curves for the impedance measured at the surface of the food which differ in their development. Different cooking or roasting conditions on the inside of the oven chamber are responsible for the different curves, with here, for example, the moisture or the speed of the fan being changed when a damper is used in the interior of the oven space. At an end point in time $t_f$, a different impedance is achieved at the surface (cf. the intersections 1 and 2) on the reaching of a corresponding end temperature on the inside of the food $T_L$ depending on the ambient conditions in the oven chamber. The difference is shown, for example, in a different degree of browning of the food and thus in the final gastronomic result.

The measurement of the different possible parameters for the control or regulation of the cooking process can take place integrally for the food or at a certain local position, for example on the inside of the food, at the centre of mass or at its surface. The data gained by the measurement can be used for an electronic regulation for the modification or correction of the unit parameters of the damper or of the oven in order to optimise the cooking or roasting process. For example, the temperature inside the oven chamber, the moisture set, any optionally set overpressure inside the oven chamber or the fan speed of a corresponding fan can be varied as parameters influencing the cooking or roasting process.

What is claimed is:

1. A method of monitoring the cooking or roasting process of foods, wherein an electrical, electromagnetic or magnetic property of the food, or of one of its parts, is measured during the cooking or roasting process, and insulation resistance or magnetic permeability of the food is measured.

2. The method of claim 1, wherein the change in the electrical, electromagnetic or magnetic property of the food, or of one if its parts, is measured in dependence on the time during the cooking or roasting process.

3. The method of claim 1, wherein an electrical voltage field of any amplitude, frequency or waveform is applied to the food during measurement.

4. The method of claim 3, wherein current resulting from the application of the electrical voltage is measured.

5. The method of claim 1, wherein an electrical current of any amplitude, frequency or waveform is applied to the food during the measurement.

6. The method of claim 5, wherein the voltage resulting from the application of the electrical current is measured.

7. The method of claim 1, wherein a magnetic field of any amplitude, frequency or waveform is applied to the food during the measurement.

8. The method of claim 1, wherein it is used to determine the change in the organic tissue of the food at its surface or in its inside during the cooking or roasting process.

9. The method of claim 1, wherein it is used to control, modify, correct or optimize the change in the organic tissue of the food at its surface or in its inside during the cooking or roasting process.

10. An apparatus for carrying out the method in accordance with claim 1, wherein it includes at least one sensor having electrodes which can be applied to the surface of the food or can be led into the inside of the food.

11. A method of monitoring the cooking or roasting process of foods, wherein an electrical, electromagnetic or magnetic property of the food, or of one of its parts, is measured during the cooking or roasting process, and it serves to determine the characteristic properties which originate from the pre-treatment of the food.

12. The method of claim 11, wherein electrical impedance of the food is measured.

13. The method of claim 11, wherein electrical resistance of the food is measured.

14. The method of claim 11, wherein the change in the electrical, electromagnetic or magnetic property of the food, or of one of its parts, is measured in dependence on the time during the cooking or roasting process.

15. The method of claim 11, wherein an electrical voltage field of any amplitude, frequency or waveform is applied to the food during measurement.

16. The method of claim 15, wherein the current resulting from the application of the electrical voltage is measured.

17. The method of claim 11, wherein an electrical current of any amplitude, frequency or waveform is applied to the food during the measurement.

18. The method of claim 17, wherein the voltage resulting from the application of the electrical current is measured.

19. An apparatus for carrying out the method of claim 11, wherein it includes at least one sensor having electrodes which can be applied to the surface of the food or can be led into the inside of the food.

20. An apparatus for carrying out a method of monitoring the cooking or roasting process of foods, wherein an electrical, electromagnetic or magnetic property of the food, or of one of its parts, is measured during the cooking or roasting process, it is used to control, modify, correct or optimize the change in the organic tissue of the food at its surface or in its inside during the cooking or roasting process, and it additionally has a temperature sensor.

21. The apparatus of claim 20, wherein electrical impedance of the food is measured.

22. The apparatus of claim 20, wherein electrical resistance of the food is measured.

23. The apparatus of claim 20, wherein the change in the electrical, electromagnetic or magnetic property of the food, or of one of its parts, is measured in dependence on the time during the cooking or roasting process.

24. The apparatus of claim 20, wherein an electrical voltage field of any amplitude, frequency or waveform is applied to the food during measurement.

25. The apparatus of claim 24, wherein the current resulting from the application of the electrical voltage is measured.

26. The apparatus of claim 20, wherein an electrical current of any amplitude, frequency or waveform is applied to the food during the measurement.

27. The apparatus of claim 26, wherein the voltage resulting from the application of the electrical current is measured.

* * * * *